June 27, 1939. R. S. SANFORD ET AL 2,163,892
STEERING MECHANISM
Filed Oct. 7, 1936
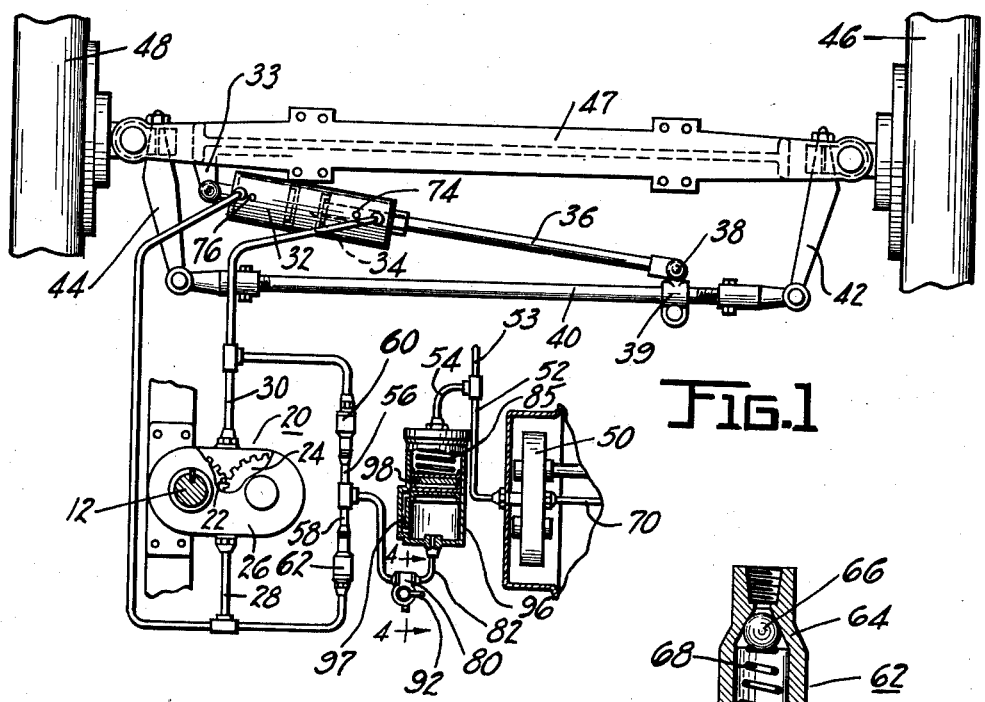
FIG.1
FIG.3
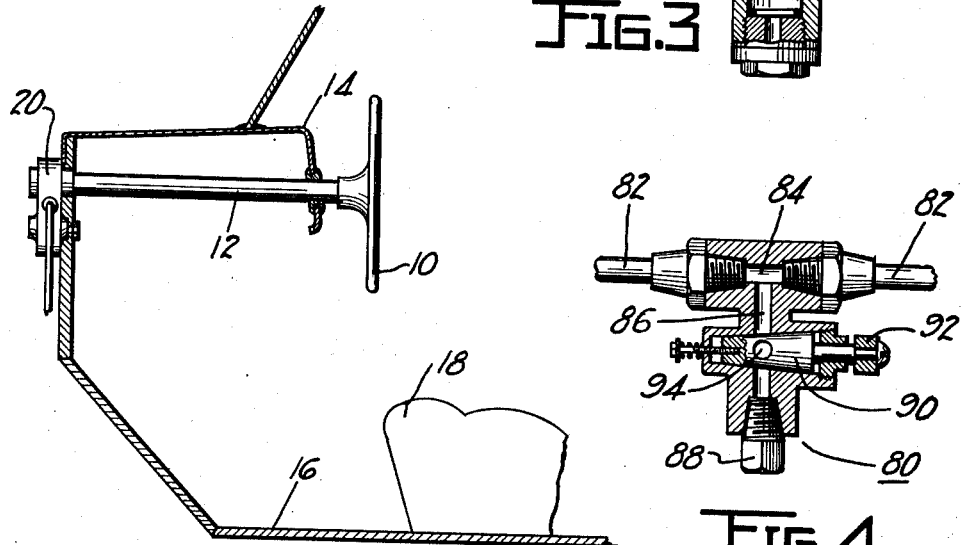
FIG.2
FIG.4
INVENTOR.
VICTOR W. KLIESRATH
ROY S. SANFORD
BY Jerome R. Cox
ATTORNEY.

Patented June 27, 1939

2,163,892

UNITED STATES PATENT OFFICE 2,163,892

STEERING MECHANISM

Roy S. Sanford, New York, N. Y., and Victor W. Kliesrath, South Bend, Ind., assignors to Bendix Products Corporation, South Bend, Ind., a corporation of Indiana Application October 7, 1936, Serial No. 104,348

2 Claims. (Cl. 60—52)

This invention relates to a liquid power transmission system and is illustrated as applied to a hydraulic steering arrangement.

An object of the invention is to provide improved means for keeping a hydraulic transmission system supplied with liquid.

One feature of the invention is the arrangement by which the automobile lubricating system is connected through check valves with the pressure transmitting system.

Another feature of the invention is the novel pressure cylinder or reservoir by which pressure is maintained in the transmission system.

Further objects and features of the invention will be apparent after a reading of the subjoined specification and claims and after a consideration of the accompanying drawing, in which:

Figure 1 is a diagrammatic plan view of a fragment of an automobile with portions shown in section and showing details of a preferred embodiment of our invention;

Figure 2 is a fragmentary view in vertical section showing the arrangement of the control for the hydraulic system;

Figure 3 is a view in section on an enlarged scale through one of the check valve arrangements; and Figure 4 is a view in section and on an enlarged scale taken substantially on the line 4—4 of Figure 1.

Referring in detail to the drawing, there is shown in Figure 2 a steering wheel 10 secured to a steering shaft 12 which extends through the dash 14 of an automobile having a floor 16. The steering wheel 10 is positioned adjacent to a seat 18 for the operator and the steering column 12 extends into a gear pump 20. The connection of the steering column 12 with the gear pump 20 is shown more clearly in Figure 1 where it may be seen that the pump comprises a pair of gears 22 and 24 meshed with each other and inclosed in a casing 26. The gear 22 is secured upon the steering column 12 and rotation of the column compels rotation of both of the gears 22 and 24 and thus depending upon the direction of rotation forces liquid out to one of the conduits 28 or 30 to one end or the other of the relatively long hydraulic cylinder 32.

The cylinder 32 is pivotally secured to an arm 33 connected to the axle 47 and is provided with a central piston 34 which is connected to a link 36, the link being also pivotally connected at 38 to a fitting 39 adjustably threaded on a tie-rod 40. The opposite ends of the tie-rod 40 are connected to steering arms 42 and 44 respectively which are in turn connected to the steerable wheels 46 and 48. Thus it may be seen that rotation of the steering wheel 10 operates the pump 20 to cause movement of the piston 34 and consequent steering movement of the steerable wheels 46 and 48.

Means are provided for maintaining the hydraulic transmission under a uniform positive pressure, for filling the system with oil, and for bleeding the system. With the arrangement shown, the system may be filled with oil such as the oils which are commonly used in hydraulic transmission systems instead of the oils which are commonly used in lubricating automobile engines.

As may be seen in Figure 1, an engine oil pump 50 is connected, through a conduit 52, a pressure cylinder or reservoir 96, a conduit 82 and branch conduits 56 and 58, with the conduits 28 and 30. There is incorporated in the conduit 82 a fitting 80 for filling the system with oil, and which fitting will be described in greater detail hereinafter. Interposed in the conduit 56 between the conduit 82 and the conduit 30 is a check valve 60, and interposed in the conduit 58 between the conduit 82 and the conduit 28 is a check valve 62. These check valves are identical and are shown more clearly in Figure 3. As may be seen, the valves 60 and 62 are simple one-way check valves, each comprising a casing 64, a ball 66 within the casing resiliently urged to its seat by a spring 68. The pump 50 draws oil from any suitable source, as, for example, from the sump of the engine through a conduit 70, and delivers this oil under pressure to the pressure cylinder 96 via conduit 52 and a conduit 54. The conduit 52 is also connected to a conduit 53, which leads to the part of the engine which it is desired to lubricate by oil under pressure.

Means are provided to bleed the hydraulic system for the elimination of air or other gases which might from time to time become included in the oil used for the hydraulic steering. For this purpose there are provided bleed openings 74 and 76 in the hydraulic cylinder 32 at the highest point or points of said cylinder, so that when the oil under pressure is forced into the hydraulic system it will carry out with it any air or other gases included, so as to fill the system with a substantially incompressible fluid.

Describing now in greater detail the fitting 80, the same is interposed in the conduit 82 and is provided with a bore 84 connecting the two sections of the conduit. Intersecting the bore 84 is a bore 86, the outer end of which is provided with a plug 88, which is removed when the nozzle of a pressure pump is attached for supplying additional liquid into the system. Interposed in the bore 86 is a plug valve 90 provided with a handle 92 by which the valve may be rotated from its normal cut-off position, as shown, to a position to align a bore 94 with the bore 86, so that liquid may be forced into the system. Provided the bleed openings 74 and 76 are open, this liquid will pass through the check valves 60 and 62 and fill the conduits 28 and 30 and the cylinder 32, carrying out through the bleed openings any air or other gas which may be included. Also, as may be clearly seen, the pump 20 will also be filled with liquid. Liquid will also be forced into the lower end of a pressure cylinder 96 or reservoir to force upward therein a piston 98 compressing the spring 85 until that cylinder is filled with liquid.

The upper end of the reservoir 96 is connected by the conduit 54 with the conduit 53 through which lubricating oil for the bearings of the engine is supplied by the lubricating pump 50. Adjacent the lower part of the reservoir 96 it is provided with a by-pass opening 97 as a safety precaution. Normally this by-pass will not be used and the liquid in the hydraulic transmission system will be kept under pressure by the spring 85 acting on the piston 98 and thus maintaining a positive pressure on the liquid in the conduit 82 and supplying additional liquid to the conduits 28 and 30, should those conduits, the pump 20 or the cylinder 32 lose any liquid by leakage. In the event, however, that, due to a delay in supplying additional liquid when needed to the fitting 80, the piston 98 approaches the lower end of the reservoir 96, then additional liquid will be forced into the hydraulic transmission system from the lubricating system. This is automatically taken care of, inasmuch as after the piston 98 has passed the upper end of the by-pass 97 lubricating oil may flow through the by-pass around the piston to the lower end of the cylinder.

The operation will now be described. Should the operator desire to steer the vehicle in either direction, he will rotate the steering wheel 10 in the customary manner so as to rotate the steering column 12. Thus, if the steering column 12 is rotated in a clockwise direction as seen in Figure 1, it rotates the gears 22 and 24 so as to draw fluid from the conduit 28 and force the fluid into the conduit 30, thus forcing fluid into the right-hand end of the cylinder 32 and withdrawing fluid from the left-hand thereof. This moves the piston 34 to the left as shown in Figure 1, and moving the tie-rod 40 in a similar direction rotates the steering arms 42 and 44 to rotate both of the steerable wheels 46 and 48 also in a clockwise direction to turn the vehicle to the right as seen in Figure 1. The pressure fluid used for the transmission of power is maintained in the system and under a predetermined pressure by the spring 85 supplemented by the pressure derived from the pump 50. Bleeding may be accomplished by the lubricating pump 50, when desired, by the removal of the bleeder screws associated with the bleeder openings 74 and 76.

While one illustrative embodiment has been described, it is not our intention to limit the scope of the invention to that particular embodiment, or otherwise than by the terms of the appended claims.

We claim:

1. Means for maintaining pressure in a hydraulic system comprising an engine lubricating pump, a conduit connecting said engine lubricating pump with the hydraulic system, a check valve interposed in said conduit, and a reservoir also interposed in said connection and provided with a piston normally separating the lubricating oil from the oil of the hydraulic system.

2. Means for maintaining pressure in a hydraulic system comprising two separate means providing fluid under pressure, fluid transmitting connections interconnecting said two separate means or sources of pressure with the hydraulic system, means interposed in said connections and constituting an element of said connections, said latter means including a reservoir, and valvular means therein automatically operable, in the event of the inadequacy of one of said sources of pressure to maintain the pressure of the system, to bring into play the other of said sources of pressure.

ROY S. SANFORD.
VICTOR W. KLIESRATH.